US009743506B2

(12) United States Patent
Bouteille

(10) Patent No.: US 9,743,506 B2
(45) Date of Patent: Aug. 22, 2017

(54) POWER SUPPLY OF MULTIPLE INDUCTIVE LOADS

(71) Applicant: EUROPEAN SYNCHROTRON RADIATION FACILITY, Grenoble (FR)

(72) Inventor: Jean-François Bouteille, Noyarey (FR)

(73) Assignee: EUROPEAN SYNCHROTRON RADIATION FACILITY, Grenoble (FR)

( * ) Notice: Subject to any disclaimer, the term of this patent is extended or adjusted under 35 U.S.C. 154(b) by 0 days.

(21) Appl. No.: 15/291,884

(22) Filed: Oct. 12, 2016

(65) Prior Publication Data

US 2017/0105277 A1    Apr. 13, 2017

(30) Foreign Application Priority Data

Oct. 13, 2015    (FR) ...................................... 15 59717

(51) Int. Cl.
*H05H 7/02*    (2006.01)
*H01F 7/06*    (2006.01)

(52) U.S. Cl.
CPC ............... *H05H 7/02* (2013.01); *H01F 7/064* (2013.01)

(58) Field of Classification Search
CPC .......... H05H 7/02; H01F 7/064; H05B 37/02; H02M 3/335

USPC ................................ 315/500–507, 39, 39.63
See application file for complete search history.

(56) References Cited

U.S. PATENT DOCUMENTS 8,183,800 B2 *    5/2012    Takayama ................ H05H 7/02
                                                                    315/500
2010/0007209 A1    1/2010    Eppler et al.
2013/0294110 A1    11/2013    Eyales

FOREIGN PATENT DOCUMENTS

WO    2009125013 A2    10/2009

OTHER PUBLICATIONS

"French Search Report" issued in counterpart French Patent Application No. 15/59717, dated Jun. 24, 2016.

* cited by examiner

*Primary Examiner* — Jimmy Vu
(74) *Attorney, Agent, or Firm* — Kaplan Breyer Schwarz, LLP

(57) ABSTRACT

A secure device for powering a plurality of inductive loads, each coupled to a dedicated converter, the device including a standby converter and, for each inductive load: a flyback diode connected to the inductive load; a circuit for detecting an anomaly of the current flowing through the inductive load; and a selection switch controlled by the detection circuit, adapted to decouple the inductive load from the specific converter and couple the inductive load to said standby converter.

18 Claims, 4 Drawing Sheets

POWER SUPPLY OF MULTIPLE INDUCTIVE LOADS

This application claims the priority benefit of French patent application number 15/59717, the content of which is hereby incorporated by reference in its entirety to the maximum extent allowable by law.

BACKGROUND

The present disclosure relates to power electronic devices, in particular to a device for powering a plurality of inductive loads.

DISCUSSION OF THE RELATED ART

In a device such as a particle accelerator, for example, a synchrotron and its storage ring, magnetic fields are generated by many electromagnets. FIG. 1 shows a device 1 for powering a group of electromagnets 2 of a particle accelerator. Each electromagnet is powered by a dedicated converter 3 comprising a conversion circuit 5, for example, a buck converter. Each dedicated converter is powered between potentials V0 and V1, which may be AC or DC, or by a three-phase power source. Each dedicated converter 3 further comprises a regulation circuit 7 comprising a sensor 9 measuring the current supplied by conversion circuit 3. Each circuit 7 is capable of having a feedback action on the associated conversion circuit 5 according to a set point value originating, over a connection 11, from a device, not shown, supervising all the electromagnets. In operation, each circuit 7 acts so that the current supplied by circuit 5 is equal to the set point value. The presence of a dedicated converter with a set point value for each electromagnet enables to finely adjust the characteristics of the particle beam flowing through the accelerator.

If the difference between the set point value and the supplied current of a single converter 3 exceeds a tolerance threshold, the particle beam is lost and the particle accelerator no longer operates. Now, for each converter, this may occur in the case of a failure of a single element, be this element one of the electronic components of conversion circuit 5, of regulation circuit 7, or of connection 11. A particle accelerator may contain several thousands of electromagnets, which all the more increases failure risks. Now, the failure of one of the many converters is a significant and frequent cause of unexpected stopping of the particle accelerator. The average time of operation with no unexpected stopping is thus strongly decreased.

It is thus desired to have a device for powering a plurality of inductive loads, enabling to finely adjust the currents in each of the inductive loads and to ensure a long operating time with no unexpected stopping.

SUMMARY

Thus, an embodiment provides a secure device for powering a plurality of inductive loads such as electromagnets of a particle accelerator, each coupled to a dedicated converter, the device comprising a standby converter and, for each inductive load: a flyback diode connected to the inductive load; a circuit for detecting an anomaly of the current flowing through the inductive load; and a selection switch controlled by the detection circuit, adapted to decouple the inductive load from the dedicated converter and couple the inductive load to said standby converter.

According to an embodiment, the device comprises at least one other standby converter, said selection switch of each inductive load being adapted to couple the electromagnet to said at least one other standby converter.

According to an embodiment, each of the converters is adapted to receive a set point value and comprises a regulation circuit adapted to regulate the current supplied by the converter according to the set point value.

According to an embodiment, the regulation circuit comprises a current sensor having an accuracy greater than 20 ppm and the detection circuit comprises a current sensor having an accuracy smaller than 0.2%.

According to an embodiment, the anomaly is detected when the absolute value of the difference between the set point value and the current flowing through the inductive load is greater than a threshold.

According to an embodiment, the threshold is in the range from 0.01% to 6% of the set point value.

According to an embodiment, the device comprises, for each of the converters, switches enabling the converter to be isolated from the rest of the device.

An embodiment provides a method of using a device such as described hereabove, comprising, after the detection of an anomaly and without stopping the device, a step a) of acting on the selection switch to decouple the inductive load from the dedicated converter and couple the inductive load to said standby converter.

According to an embodiment, the method comprises keeping a standby converter powered on in the absence of a detected anomaly, the standby converter supplying an output voltage.

According to an embodiment, the method comprises, after step a), without stopping the device, the steps of: b) repairing or replacing the dedicated converter; and c) controlling the selection switch to decouple the inductive load from the standby converter and couple the inductive load to said dedicated converter.

The foregoing and other features and advantages will be discussed in detail in the following non-limiting description of dedicated embodiments in connection with the accompanying drawings.

DETAILED DESCRIPTION

Figure 1:
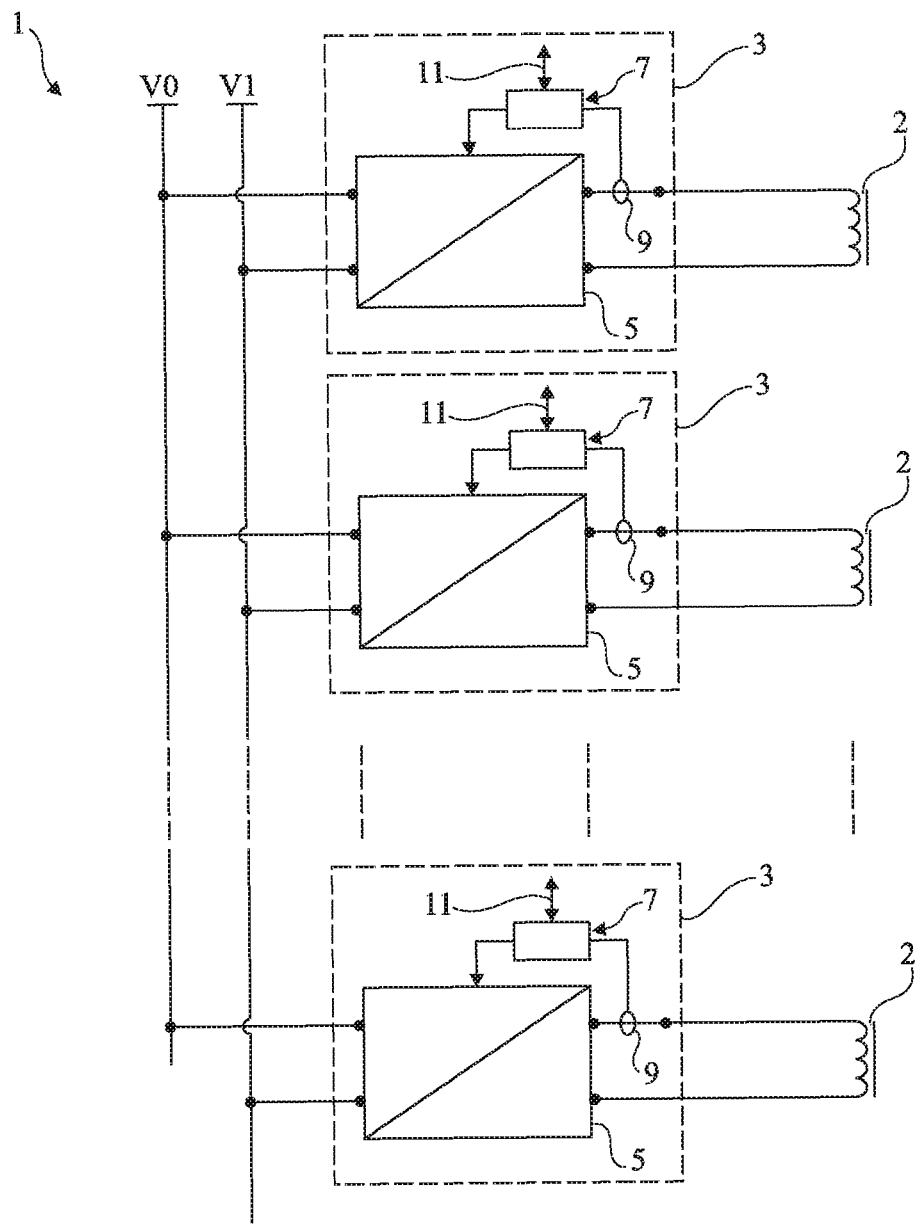
FIG. 1 shows a device for powering a plurality of electromagnets.

The same elements have been designated with the same reference numerals in the different drawings. For clarity, only those elements which are useful to the understanding of the described embodiments have been shown and are detailed. In particular, the details of conversion circuits and of a supervision circuit are neither shown, nor detailed.

Figure 2:
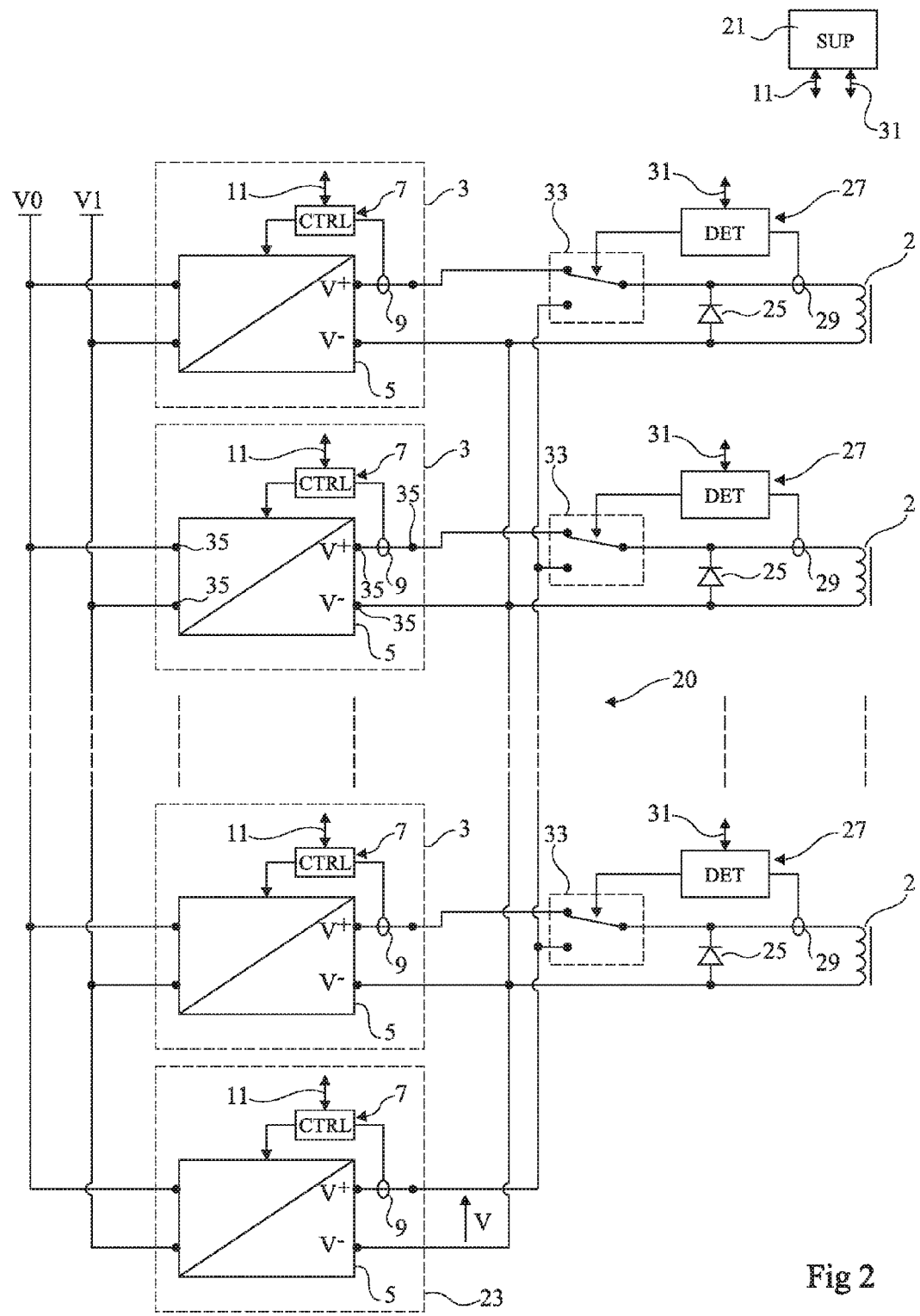
FIG. 2 shows an embodiment of a device for powering a plurality of inductive loads.

FIG. 2 shows an embodiment of a secure device 20 for powering a group of inductive loads, for example electromagnets of a particle accelerator provided or not with its storage ring. The particle accelerator may be a synchrotron or an accelerator for a medical use. Device 20 comprises a group of electromagnets 2. Each electromagnet is associated with a dedicated converter 3. Converters 3 are similar to the converters previously described in relation with FIG. 1, that is, each one comprises:

a conversion circuit 5, for example, a buck converter;

a regulation circuit (CTRL) 7 comprising a sensor 9 measuring the current supplied by the conversion circuit; and a connection 11 between regulation circuit 7 and a supervision device (SUP) 21 supervising the entire device 20.

Electromagnets 2 may be different from one another. Electromagnets 2 preferably have similar power supply currents, and may have different resistances and/or inductances. Each converter 3 is capable of supplying, between terminals V+ and V−, the current and the voltage corresponding to the associated electromagnet. Each regulation circuit 7 is capable of having a feedback action on parameters of the associated conversion circuit, for example, on the duty cycle of the buck converter, so that the supplied current is equal to a set point value. Conversion circuits 5 are for example powered between potentials V0 and V1 common to the entire device. Conversion circuits 5 may also be powered by a plurality of power sources, which may be DC, single-phased or three-phased.

Further, device 20 comprises a standby converter 23. Converter 23 comprises the same elements as converter 3, that is, a conversion circuit 5, a regulation circuit 7 comprising a sensor 9, and a connection 11 with supervision device 21. Connection 11 may be a digital connection such as an Ethernet connection.

Device 20 further comprises for each electromagnet 2:

a flyback diode 25 associated with each electromagnet, that is, a diode connected in parallel on the electromagnet;

a detection circuit (DET) 27 comprising a current sensor and capable of communicating over a connection 31 with supervision device 21; and a selection switch 33.

The terminal of each electromagnet 2 on the side of the anode of the associated diode 25 is coupled to terminals V− of the dedicated converters 3 and of standby converter 23. The terminal of each electromagnet 2 on the side of the cathode of diode 25 is coupled, according to the position of switch 33, to terminal V+ of dedicated converter 3 or to terminal V+ of standby converter 23.

The current sensor 29 of each detection circuit 27 is positioned to monitor the intensity of the current flowing through the associated electromagnet 2. In the shown embodiment, sensor 29 is arranged between the electromagnet and the cathode of diode 25. Sensor 29 may also be arranged between the electromagnet and the anode of diode 25. Detection circuit 27 controls the position of the associated switch 33.

In normal operation of the particle accelerator, all dedicated converters 3 and standby converter 23 are powered. Switches 33 couple each electromagnet 2 to its dedicated converter 3. The output of standby converter 23 is thus open, and the voltage between output terminals V+ and V− of converter 23 is regulated by regulation circuit 7. Converter 23 thus supplies a voltage V.

The current flowing through each electromagnet is detected by the associated detection circuit 27 and compared with a set point value. As an example, detection circuit 27 communicates the value of the current to supervision device 21, which then performs the comparison. Supervision circuit 21 can thus transmit the set point value to detection circuit 27 which, in this case, performs the comparison.

In case of a failure of a converter 3, due to a failure, for example of its conversion circuit 5, of its regulation circuit 7, or of its connection 11, electromagnet 2 is no longer properly powered, and may not be powered at all any more. However, the current keeps on flowing in the electromagnet, due to inductance L of the electromagnet and to flyback diode 25. The magnetic energy available in the electromagnet takes time to be dissipated by resistor R of the loop formed by the diode and the electromagnet. The current thus varies slowly. For example, time constant L/R is in the range from 0.2 second to 1 second.

During this failure, the intensity of the current in the associated electromagnet 2 progressively deviates from the set point value. The particle beam flowing through the accelerator is maintained as long as this deviation does not exceed, in absolute value, a tolerance threshold, for example, 15% of the set point value. The current first crosses a detection threshold, for example, 1% of the set point value, smaller than the tolerance threshold. Once the detection threshold has been crossed, the associated switch 33 decouples electromagnet 2 from its dedicated converter 3 and couples it to standby converter 23. At the same time, the set point value is transmitted to regulation circuit 7 of standby converter 23. The electromagnet is thus properly powered again and the intensity of the current catches up with the set point value after a transient phase, without crossing the tolerance threshold.

The particle accelerator can thus keep on operating when a converter fails. Thus, device 20 enables the operating time of the particle accelerator to be considerably lengthened with no unexpected stopping.

It should be noted that at the time when switch 33 changes position, the standby converter already supplies a voltage V between its output terminals. The presence of this voltage enables the duration of the transient phase to be decreased and the amplitude of the current variations in the electromagnet to be limited during this phase. Voltage V is adapted to the power supply voltages of the electromagnets. As an example, voltage V in open circuit may be an internal characteristic of converter 23, and voltage V can then be greater than the power supply voltages of the electromagnets. Voltage V can thus be determined by supervision device 21.

After the failure, defective converter 3 can then be dismounted at the level of dismountable connections 35, and then repaired or replaced. As an example, the replacing of converter 3 may be performed during a maintenance phase scheduled in advance. Converter 3 may also be replaced during the device operation. The repair or the replacement may be eased if switches, not shown, enable each converter 3 to be isolated from the rest of device 20. When the new converter 3 is installed, switch 33 is set back to the normal operating position during the operation of the particle accelerator, and the device returns to the normal operation with no interruption of the beam.

It should be noted that the current sensors 29 which monitor the currents flowing through the electromagnets may be less accurate than current sensors 9 which are used to accurately regulate these currents. For example, current sensors 9 have an accuracy greater than 20 ppm. Current sensors 29 may have an accuracy smaller than 0.2%. Sensors 29 may be Hall-effect sensors or resistive elements.

Thus, the detection of an anomaly of the current in each electromagnet is performed by simple, robust, and inexpensive means. The elements dedicated to making device 20 secure come down to a few simple elements for each of the many converters and to one standby converter. An advantage is that secure device 20 is a simple and inexpensive way of strongly increasing the reliability of the particle accelerator.

The tolerance threshold, corresponding to the stopping of the accelerator, may be in the range from 0.1% to 20% of the set point value. The detection threshold, corresponding to an anomaly in the operation of the dedicated converter, may be in the range from 10% to 30% of the tolerance threshold. The comparison between the current and the detection threshold may be performed by the supervision device successively for each electromagnet. The current in each electromagnet is then cyclically monitored with a period for example in the range from 100 µs to 1 ms. As an example, the crossing of the threshold is detected if the deviation between the current and the set point value is greater than the threshold for 5 consecutive cycles.

The power supply voltages of the electromagnets may be in the range from a few volts to some hundred volts, for example, from 3 to 150 V. The power supply currents of the electromagnets may be in the range from a few tens to a few hundreds of amperes, for example, from 20 to 500 A. As an example, switch 33 is a power MOS transistor switch. For example, the power MOS transistors of the switch have an on-state resistance smaller than 0.5 m●. Flyback diode 25 is for example a Schottky power diode. Connection 31 may be an Ethernet connection.

As an example, for a particle accelerator comprising up to a few thousands of electromagnets, a few hundreds of devices 20 each comprising from 3 to 16 electromagnets may be provided.

Figure 3A:
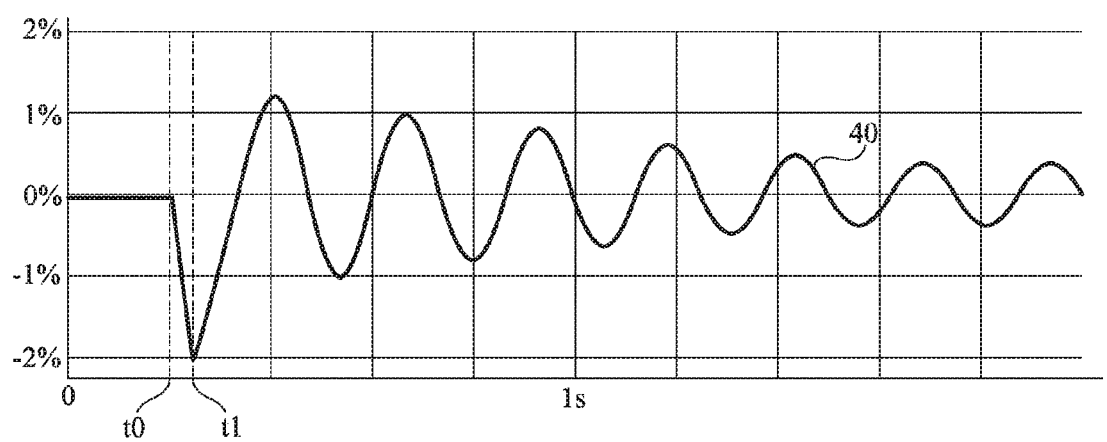
FIGS. 3A and 3B show, in the device of FIG. 2, an example of deviation between the current in an electromagnet and a set point value, and the position of a switch.
Figure 3B:
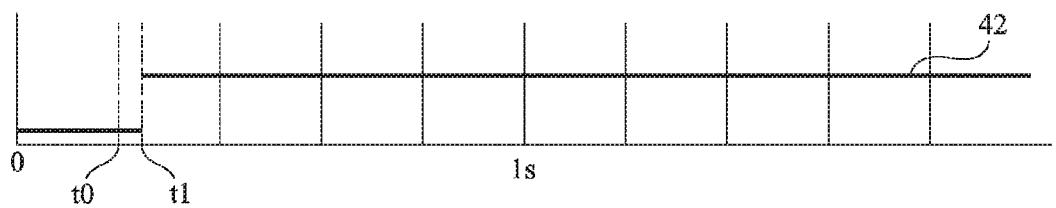

FIG. 3A shows, in device 20 of FIG. 2, an example of percentage deviation 40 between the current in an electromagnet and the associated set point value 41, when the dedicated converter associated with the electromagnet has failed. FIG. 3B shows position 42 of the switch, the low position corresponding to the coupling of the electromagnet to its dedicated converter 3, and the high position corresponding to the coupling of the electromagnet to standby converter 23.

At an initial time t0, a failure of dedicated converter 3 occurs and the electromagnet is no longer powered. For some twenty milliseconds, the current flows through the electromagnet via the flyback diode, while slowly decreasing. The current crosses the provided detection threshold at a time t1. The crossing is detected by the detection circuit, which changes the position of switch 33 and couples the electromagnet to standby converter 23, which is already powered on. The voltage already present at the output of converter 23 applies to the electromagnet and the current in the electromagnet increases with no delay. Then, the current oscillates around the set point value during a transient phase of a few seconds, before stabilizing at the set point value.

The duration and the variations of the current during the transient phase depend on the characteristics of regulation circuit 7 of converter 23. In this example, regulation circuit 7 of standby converter 23, for example, a PID regulator, is capable of obtaining, in the case where the electromagnet is replaced with a resistive load, a response time shorter than the time constant of the electromagnet. Oscillations such as shown then occur. The inventors have observed that such oscillations improve the operation of the electromagnet by stabilizing the generated magnetic field.

Figure 4:
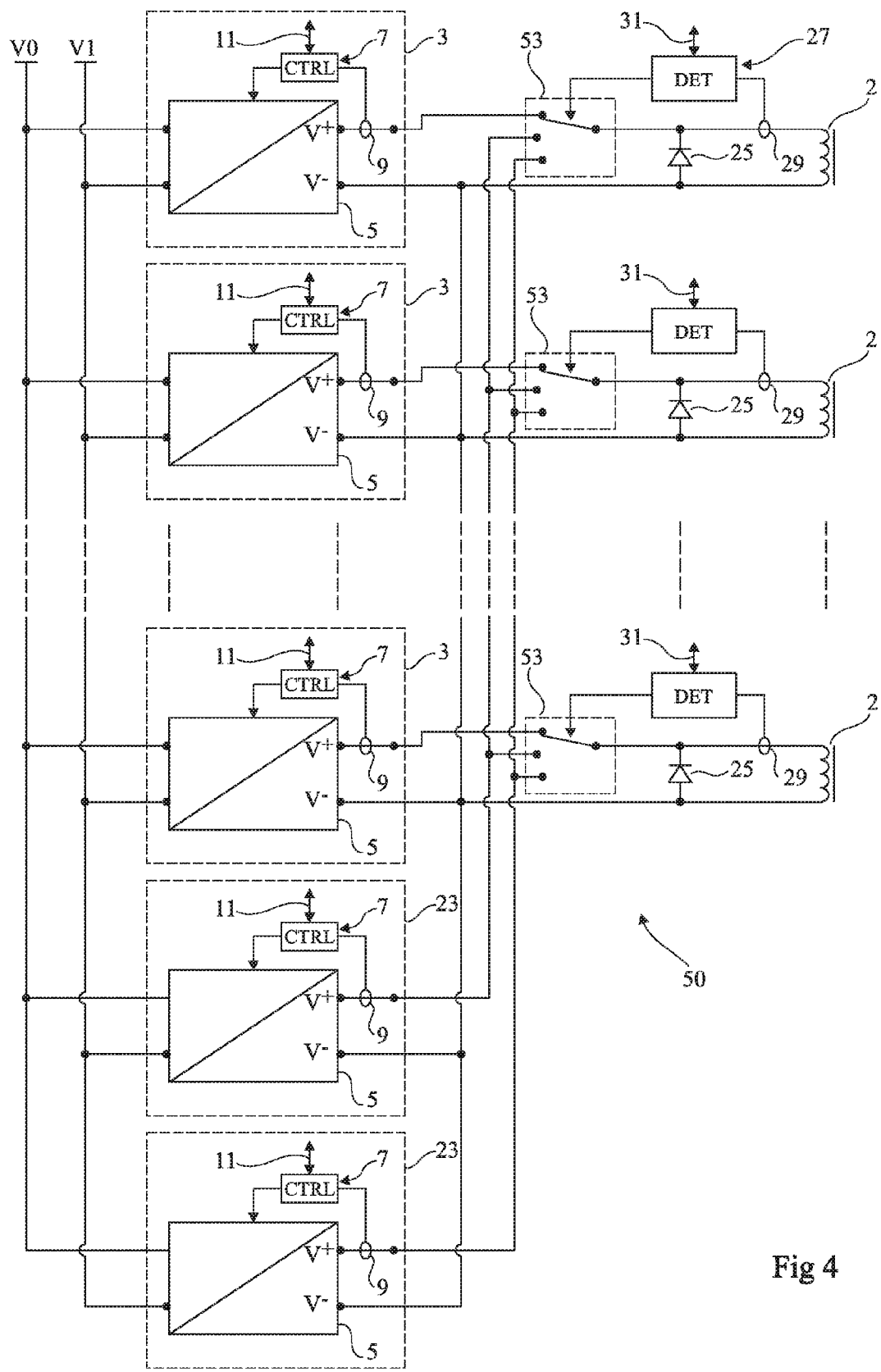
FIG. 4 shows another embodiment of a device for powering a plurality of inductive loads.

FIG. 4 shows another embodiment of a device 50 for powering a plurality of inductive loads, for example, electromagnets of a particle accelerator. Device 50 corresponds to device 20 described in relation with FIG. 2, to which another standby converter 23 has been added. The dual-path switches of device 20 have been replaced with triple-path selection switches 53 in device 50. The terminal of each electromagnet located on the cathode side of the associated diode is coupled, according to the position of selection switch 53, to terminal V+ of the dedicated converter or to terminal V+ of one of the standby converters or to terminal V+ of the other standby converter.

The operation of device 50 is identical to the operation of device 20 shown in FIG. 2. Device 50 enables the operation of the particle accelerator to be maintained while up to two converters have failed, which advantageously allows a longer operation with no unexpected stopping.

Although the devices described herein have been provided in the case of failures causing a variation of the current flowing through an electromagnet, the devices may also be used to ensure the continuity of the operation of a particle accelerator in the case of other types of failures. The metal portions of the elements of the device may be connected to a ground and, as an example, the failure may be a current leakage between one of the elements of the device and the ground. The leakage is detected by a difference between the input and output currents of the general device. A problem then is to find the element which is responsible for the leakage. The following steps may be successively carried out for each of converters 3:

a) decoupling the associated electromagnet from converter 3 and coupling it to a standby converter 23;

b) isolating converter 3, for example, by means of switches;

c) verifying the presence of the leakage;

d) powering back on converter 3; and e) decoupling the electromagnet from the standby converter and coupling it to converter 3.

The absence of a leakage at step c) shows that the concerned converter 3 is responsible for the leakage. The faulty converter 3 can be replaced before proceeding to step d). Thus, this type of failure can be repaired without having to stop the particle accelerator.

Specific embodiments have been described. Various alterations, modifications, and improvements will occur to those skilled in the art. In particular, although in the previously-described devices, a single terminal of each electromagnet is coupled, according to the position of the selection switch, to terminal V+ of the dedicated converter or to terminal V+ of a standby converter, other variations are possible where the selection switch is a bipolar switch. In such variations, the two terminals of the electromagnets are simultaneously coupled, according to the position of the selection switch, to terminals V+ and V− of the dedicated converter or to terminals V+ and V− of a standby converter.

Further, although the previously-described devices only comprise one or two standby converters, it is possible to add other standby converters, by adding as many paths to each selection switch. Each standby converter may be used in case of a failure of any of the dedicated converters of the device. The operation is thus ensured for a number of failing dedicated converters equal to the number of standby converters. The number of standby converters should thus be adapted to the number of dedicated converters. As an example, a device comprising 3 dedicated converters comprises only 1 standby converter. In another example, a device comprising 16 dedicated converters comprises 3 standby converters and four-path selection switches.

Further, although the previously-described devices are provided to secure the power supply of the inductive loads in the case of a failure causing a decrease of the current in an electromagnet, the power supply may be secured in the case of a failure causing an increase of the current in the electromagnet. This may occur, for example, when the conversion circuit is a buck converter. In this case, due to the high inductance of the electromagnet, the current increase is slow, and the operation of the device is similar to the operation described in the case of a failure causing a current decrease.

Further, although, in the described embodiments, the detection circuits communicate with a supervision circuit, it is possible to provide autonomous detection circuits detecting a deviation between the intensity of the current flowing through the electromagnet and a value set beforehand.

Further, although the detection circuits communicate digitally over an Ethernet connection, it is possible, as a variation, to form analog detection circuits. The communications may be at least partly analog.

Further, although during the normal operation of the disclosed device, the standby converters are all powered on, other operations are possible where, for example, a standby converter is stopped, the important point being for a standby converter to be able to provide a current within an adapted time delay.

Further, although the above-described devices power electromagnets of particle accelerators, these devices may be used to power other inductive loads.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A secure device for powering a plurality of electromagnets of a particle accelerator, each coupled to a dedicated converter, the device comprising a standby converter and, for each electromagnet:
   a flyback diode connected to the electromagnet;
   a circuit for detecting an anomaly of the current flowing through the electromagnet; and
   a selection switch, controlled by the detection circuit, adapted to decouple the electromagnet from the dedicated converter, and couple the electromagnet to said standby converter.

2. The device of claim 1, comprising at least one other standby converter, said selection switch of each electromagnet being adapted to couple the electromagnet to said at least one other standby converter.

3. The device of claim 1, wherein each of the converters is adapted to receive a set point value and comprises a regulation circuit adapted to regulate the current supplied by the converter according to the set point value.

4. The device of claim 3, wherein the regulation circuit comprises a current sensor having an accuracy greater than 20 ppm and the detection circuit comprises a current sensor having an accuracy smaller than 0.2%.

5. The device of claim 3, wherein the anomaly is detected when the absolute value of the difference between the set point value and the current flowing through the electromagnet is greater than a threshold.

6. The device of claim 5, wherein the threshold is in the range from 0.01% to 6% of the set point value.

7. The device of claim 1, comprising, for each of the converters, switches enabling the converter to be isolated from the rest of the device.

8. A method of using the device of claim 1, comprising, after the detection of an anomaly and without stopping the particle accelerator, a step a) of acting on the selection switch to decouple the electromagnet from the dedicated converter and couple the electromagnet to said standby converter.

9. The method of claim 8, comprising keeping a standby converter powered on in the absence of a detected anomaly, the standby converter supplying an output voltage.

10. The method of claim 9, comprising after step a), without stopping the particle accelerator, the steps of:
   b) repairing or replacing the dedicated converter; and
   c) controlling the selection switch to decouple the electromagnet from the standby converter and couple the electromagnet to said dedicated converter.

11. The device of claim 2, wherein each of the converters is adapted to receive a set point value and comprises a regulation circuit adapted to regulate the current supplied by the converter according to the set point value.

12. The device of claim 11, wherein the regulation circuit comprises a current sensor having an accuracy greater than 20 ppm and the detection circuit comprises a current sensor having an accuracy smaller than 0.2%.

13. The device of claim 12, wherein the anomaly is detected when the absolute value of the difference between the set point value and the current flowing through the electromagnet is greater than a threshold.

14. The device of claim 13, wherein the threshold is in the range from 0.01% to 6% of the set point value.

15. The device of claim 4, wherein the anomaly is detected when the absolute value of the difference between the set point value and the current flowing through the electromagnet is greater than a threshold.

16. The device of claim 15, wherein the threshold is in the range from 0.01% to 6% of the set point value.

17. The device of claim 11, wherein the anomaly is detected when the absolute value of the difference between the set point value and the current flowing through the electromagnet is greater than a threshold.

18. The device of claim 17, wherein the threshold is in the range from 0.01% to 6% of the set point value.

* * * * *